US008197631B2

(12) United States Patent
Öz

(10) Patent No.: US 8,197,631 B2
(45) Date of Patent: Jun. 12, 2012

(54) METHOD OF TRANSFER PRINTING, AND PRINT ORIGINALS FOR THESE PURPOSES

(76) Inventor: Bülent Öz, Mannheim (DE)

( * ) Notice: Subject to any disclaimer, the term of this patent is extended or adjusted under 35 U.S.C. 154(b) by 336 days.

(21) Appl. No.: 11/961,674

(22) Filed: Dec. 20, 2007

(65) Prior Publication Data

US 2008/0160229 A1 Jul. 3, 2008

(30) Foreign Application Priority Data

Dec. 23, 2006 (DE) ......................... 10 2006 062 446

(51) Int. Cl.

| | |
|---|---|
| ***B29C 65/02*** | (2006.01) |
| ***B32B 37/06*** | (2006.01) |
| ***B32B 37/14*** | (2006.01) |
| ***B32B 37/26*** | (2006.01) |
| ***B32B 37/30*** | (2006.01) |
| ***B32B 38/10*** | (2006.01) |
| ***B32B 38/18*** | (2006.01) |
| ***B32B 37/10*** | (2006.01) |
| ***B44C 1/24*** | (2006.01) |
| *B29C 65/48* | (2006.01) |
| *B32B 37/12* | (2006.01) |
| *B44C 1/17* | (2006.01) |

(52) U.S. Cl. ......... 156/277; 156/230; 156/240; 156/289

(58) Field of Classification Search .................. 156/230, 156/240, 277, 289, 247
See application file for complete search history.

(56) References Cited

U.S. PATENT DOCUMENTS 4,123,578 A * 10/1978 Perrington et al. ........... 428/206
4,391,853 A * 7/1983 Pointon ......................... 427/152
4,704,310 A 11/1987 Tighe et al.
4,919,994 A * 4/1990 Incremona et al. ........... 428/141
5,284,688 A * 2/1994 Hiatt ............................ 428/41.4
5,391,247 A * 2/1995 Kamen et al. ................. 156/233

(Continued)

FOREIGN PATENT DOCUMENTS

DE 10 2005 009 269 B3 8/2006

(Continued)

OTHER PUBLICATIONS varnish. (n.d.). Dictionary.com Unabridged (v 1.1). Retrieved Aug. 11, 2009, from Dictionary.com website: http://dictionary.reference.com/browse/varnish.*

(Continued)

*Primary Examiner* — Sonya Mazumdar
(74) *Attorney, Agent, or Firm* — Paul D. Strain, Esq.; Strain & Strain PLLC

(57) ABSTRACT

The present invention relates to a method of transfer printing on substrates that comprises the steps of printing a UV-curing substance onto a polymeric release layer of a transfer material at regions not intended for transfer to the substrate. This release layer has at least one image which is printed from conventional inks, or it is a colored film. The method further comprises at least partial transfer of the image or the colored film or a combination of the aforementioned to the substrate under the action of heat and pressure, and removal of the transfer material from the substrate. The regions of the polymeric release layer coated with the UV-curing substance are detached from the substrate, and the image-bearing regions of the polymeric release layer or the colored film regions, or the combination thereof, remain joined to the substrate.

14 Claims, 2 Drawing Sheets

U.S. PATENT DOCUMENTS

| | | | | | |
|---|---|---|---|---|---|
| 5,656,116 | A * | 8/1997 | Soltysiak | ...................... | 156/277 |
| 5,766,401 | A * | 6/1998 | Campbell et al. | ............. | 156/277 |
| 6,149,754 | A * | 11/2000 | Ogata et al. | ................... | 156/241 |
| 6,277,229 | B1 * | 8/2001 | Popat et al. | ................... | 156/230 |
| 6,733,611 | B2 * | 5/2004 | Hayashi et al. | ............... | 156/230 |
| 6,849,312 | B1 | 2/2005 | Williams | | |
| 6,957,030 | B2 * | 10/2005 | Baker et al. | ................... | 399/222 |
| 7,117,794 | B2 * | 10/2006 | Taffinder | ....................... | 101/483 |
| 7,325,916 | B2 * | 2/2008 | Baker et al. | ................... | 347/101 |
| 2004/0026017 | A1 * | 2/2004 | Taylor et al. | .................. | 156/230 |
| 2005/0150592 | A1 * | 7/2005 | LaFaille | ........................ | 156/240 |
| 2009/0136866 | A1 * | 5/2009 | Kronzer | ........................ | 430/205 |

FOREIGN PATENT DOCUMENTS

| | | | |
|---|---|---|---|
| DE | 102005009269 | B3 * | 8/2006 |
| EP | 1136274 | A2 * | 9/2001 |
| WO | WO 00/64685 | A1 | 11/2000 |
| WO | WO 03066337 | A2 * | 8/2003 |

OTHER PUBLICATIONS

English translation of EP2104617; Oz, Bulent. Dec. 18, 2007.*

Forever Digital Transfer Applications Technology, video available online at http://www.forever-ots.com/videos/en/forever_nocut_EN.wmv ), accessed May 3, 2011.

* cited by examiner

METHOD OF TRANSFER PRINTING, AND PRINT ORIGINALS FOR THESE PURPOSES

CROSS-REFERENCE TO RELATED PATENT APPLICATIONS

The right of foreign priority is claimed under 35 U.S.C. §119(a) based on Federal Republic of Germany Application No. 10 2006 062 446.7, filed Dec. 23, 2006, the entire contents of which, including the specification, drawings, claims and abstract, are incorporated herein by reference.

BACKGROUND OF THE INVENTION

The present invention relates to a method of carrying out transfer printing and also to print originals for the carrying-out of the method.

By transfer printing is meant a method in which images are produced by printing the release layer of a transfer material such as a transfer paper with conventional toner inks, low-viscosity inks, offset inks, flex inks or the like, then turning the printed side of the transfer material toward a substrate and transferring it to a substrate under the action of heat and pressure. The substrate may be a T-shirt and the transfer of the release layer may take place by ironing on under gentle pressure at 200° C. One such method is described in DE 10 2005 009 269, for example.

In this procedure the release layer, which may be a film laminated with the paper, becomes detached from the paper, and the film together with the printed image becomes joined to the substrate. A corollary of this procedure is that the polymeric film is transferred to the substrate even at those locations at which there are no imaging details or no printing inks, respectively. The transfer of the non-ink-bearing regions of the film sections as well is unwanted. The surface of the substrate may be impaired: a woven textile fabric, for instance, becomes more rigid and tends to develop small cracks, which in the case of relatively large film surfaces are conspicuous, particularly in the context of the non-ink-bearing areas. In order to have no excess film sections on the woven textile fabric, therefore, it will be necessary to punch or cut out the desired region to be transferred, a very onerous task.

For these purposes it is possible to use what are known as cutting plotters, where there are two areas of application: on the one hand, the cutting of uni-colored flex films which are offered in different colors, and on the other hand for the cutting of digital transfer films which are printed and contour-cut. Printers from the company Roland are able to print and contour-cut. Other printers (Mimaki, Mutoh, Seiko, HP) print with a first machine and cut the contour by means of a second machine, in which case the second machine must possess a register mark recognition system. The digital printing machines are becoming faster, i.e., the printing times are becoming shorter; however, the cutting operation is reaching physical limits, and in any case the non-print locations must be matrix-stripped manually. This is also not accomplished in one operation: for example, the inside parts of letters remain on the transfer film and must be taken out individually.

Materials such as paper or card are also suitable for enhancement by means of one kind of transfer printing: hot foil stamping. This method is used to enhance the value of a printed article by impressing ink-coated foils onto a paper or the card by means of pressure and heat. This method can also be employed in conjunction with relief printing.

The method requires high pressing pressures and enables an image to be applied, gloss or matt, to a printed article by means of the transferred film, depending on the type of film. As in the case of textiles it may be desirable here as well for only the printed regions together with the film to remain on the printed article.

Here as well, therefore, in order to avoid excess film regions, the images would have to be cut out by hand or by automatic units specifically intended for that purpose, in such a way that only the printed film areas are transferred to the substrate.

SUMMARY OF THE INVENTION

It is an object of the present invention, accordingly, to provide a means of avoiding this cutting-out operation, so that when the transfer print is transferred to the substrate it is only the desired print parts, and not adjacent film regions, that become joined to said substrate.

This object is achieved by a method of transfer printing on substrates that involves first printing a polymeric release layer with an image from conventional toner inks, low-viscosity inks, offset inks, flex inks or other suitable inks, the image being intended for transfer to the substrate under the action of heat and pressure. Additionally, in accordance with the invention, the regions of the polymeric film that are not intended for transfer to the substrate are printed with a UV-curing substance which in chemical terms is equivalent to a UV-curing ink but which need not necessarily include chromophoric pigments. Provided accordingly is a mask (negative image) comprising a UV-curing coating.

It has emerged as advantageous that, employing the conventional conditions of transfer printing, the regions provided with UV-cured coating are not transferred to the substrate but instead remain on the film and are lifted from the substrate with the film or with the paper with which the film forms a laminate. The film remains, however, on the printed regions, so that in the case of a textile print, for example, the wash resistance of the transferred ink regions is retained, since they are covered by the film material and/or are joined to it and to the substrate. In the case of application of the method to printed articles or other harder surfaces, images applied—which may equally be any desired figures or else alphanumeric symbols—remain covered by film and so acquire a desired gloss and a superior appearance.

The substances used in accordance with the invention may be UV-curing inks, of the kind which are used, for example, in letterpress and offset printing, in screen printing, and in flexographic printing and which are known to the skilled worker. For the method of the invention these substances need not comprise chromophores; clear varnishes, for example, are substances of this kind. They comprise binders based on acrylated polyesters, polyethers, and polyurethanes, and also epoxy compounds. They are solvent-free and contain photoinitiators which on irradiation with UV light form reactive particles that initiate the polymerization or the curing of the system; see, for example, Verband der Druckfarbenindustrie (German Printing Inks Industry Association), datasheet "UV-härtende Druckfarben und Lacke" (UV-curing Printing Inks and Varnishes), the entire contents of which are hereby incorporated by reference.

Since printing in modern color printers is under computer control, it is possible to comply very precisely with the boundary between the conventional toner ink regions and the region not intended for printing.

One very advantageous application of the method of the invention is, for example, the printed application of laundry labels, for example, to the collar areas or at another desired location, meaning that they don't have to be stitched to the clothing item, which by comparison is a more complicated operation.

The release material or release paper can be printed with any conventional toner, such as with water-soluble or solvent-borne low-viscosity inks or sublimation inks, or polymer inks or other inks which are used in digital printer systems, or else with flexo inks, screen printing inks, offset inks or the like.

The method can be carried out with particular elegance using digital systems which detect the color boundaries and carry out digital detection of the delimitation of the ink to be transferred from the UV-curing substance—in other words, the substance which does not provide sealing of the material to be printed—and which print accordingly. In this case it is immaterial in principle whether it is the sealing ink, in other words the printing ink, or the nonsealing substance that is printed on first.

Conventional multicolor printers with up to 8 colors, such as with two print units each of four colors, for example, can be converted so that an ink—of whatever hue—is applied in "one operation" with the UV-curing substance or ink, in which case the printer must be equipped with a corresponding UV radiation source or must have a UV station connected downstream of it.

Another possible procedure in accordance with the invention is to print a polymeric film colored black, for example, in mirror-image format, as a negative image, with UV inks at those points which are not to be transferred to the substrate, before ironing it on. When, after ironing, the regions coated with UV-curing sealing material are removed from the transfer film, the result is a positive image. It is possible to proceed in this way in particular when applying writing to textiles. A similar procedure can also be adopted when transferring a film to paper, card or any other suitable material, in combination, for instance, with the hot foil process.

Protection is presently also claimed, therefore, for prefabricated print originals for transfer printing that have been provided with a UV-curing coating at the locations where no transfer is to take place.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
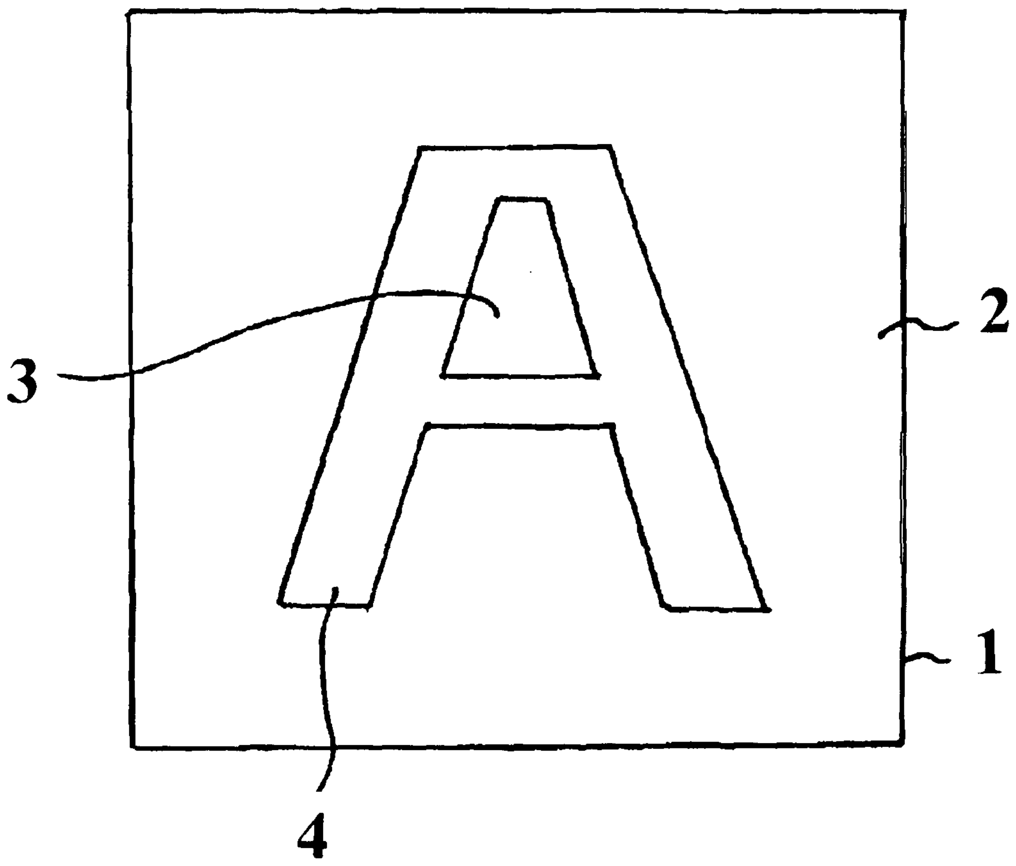
FIG. 1 provides an illustration of an exemplary embodiment of the present invention.
Figure 2:
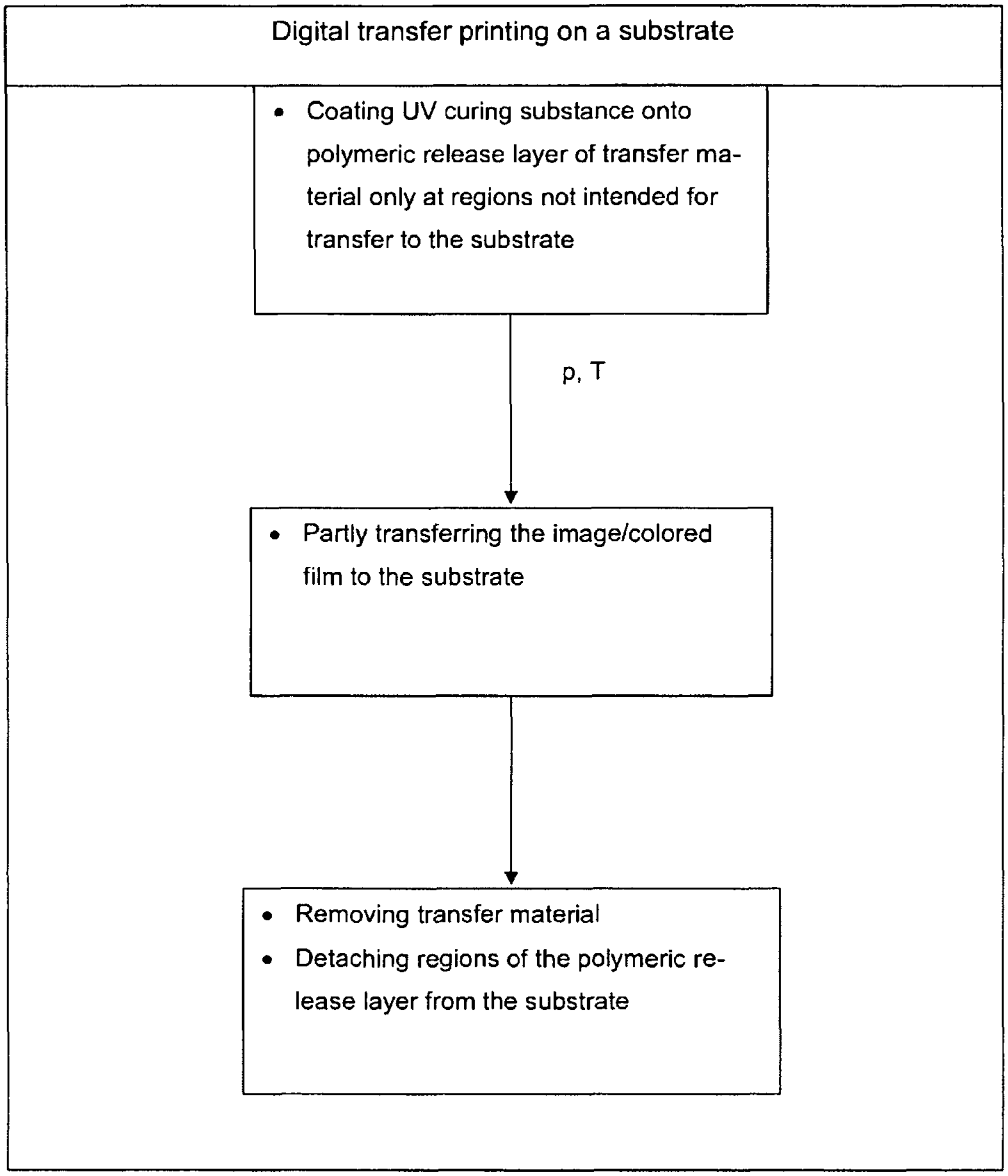
FIG. 2 provides an illustrative flow chart describing a method in an exemplary embodiment of the present invention.

Depicted is a label 1 with a letter A which is to be transferred in any desired monochrome or polychrome design to a fabric underlayer or the like. The letter is printed onto the release layer, such as a PE film of a backing paper. In the present case, only the letter itself is to be transferred, but not the marginal region 2 or the space 3 in between, so that these remain free from polymer on the substrate after ironing. For this purpose these regions 2 and 3 have been printed with a UV-curing coating.

When an imprint of this kind is ironed onto a T-shirt, for example, then only the areas 4 that constitute the letter become joined (at approximately 150-200° C.) to the fabric, and so, after the removal of the backing paper or the film, only the area 4 remains on the substrate; the regions 2 and 3, in contrast, are the regions not joined to the substrate, and in these regions the release film together with release paper can simply be lifted off.

When transparent inks are used, the imprint can be applied to white textiles, and when opaque inks are used it can also be applied to black textiles.

The substrate used may in principle be any desired surface such as metal, wood, leather, etc., but more particularly a textile.

The differential transfer printing of the invention therefore avoids, in a simple way and one which can be automated, the transfer of excess areas of polymer to the substrates. With particular advantage the invention can be applied in the context of multicolor prints, using sublimation inks.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method of transfer printing, comprising:

a) in a single operation, applying at least one of a UV-curing substance onto a first region of a polymeric release layer of a transfer material and an image onto a second region of the polymeric release layer, wherein the image is formed of conventional inks, a colored film, or a combination thereof;

b) transferring at least part of the image to a substrate under the action of heat and pressure; and c) removing the transfer material from the substrate such that the transferred parts of the image remain joined to the substrate, wherein the first region is not intended for transfer to the substrate.

2. The method of claim 1, wherein said applying is performed in a single apparatus.

3. The method of claim 2, wherein the single apparatus comprises a multicolor printer, comprising a printing station for delivering UV-curing inks, and a UV lamp.

4. The method of claim 1, wherein the inks are selected from the group consisting of a toner ink, a low-viscosity ink, an offset ink, a flex ink and a sublimation ink.

5. The method of claim 1, wherein the UV-curing substance comprises a UV-curing varnish or a UV-curing ink.

6. The method of claim 1, wherein the substrate is selected from the group consisting of a woven textile fabric, a printed article, wood and leather.

7. The method of claim 1, wherein the polymeric release layer comprises a hot foil suitable for transfer printing under pressure.

8. A method of transfer printing, comprising:

a) printing a first region and a second region onto a polymeric release layer of a transfer material; wherein the first region is printed with a UV-curing substance; wherein the second region is printed with an ink or a colored film and comprises an image intended to be transferred onto a substrate; and wherein the first and second regions are formed simultaneously;

b) placing the printed image which is on the polymeric release layer of the transfer material in contact with the substrate;

c) applying heat and pressure to the transfer material; and d) removing the transfer material such that said second region of the printed area is transferred to the substrate while the first region is not transferred onto the substrate.

9. The method of claim 8, wherein said applying is performed in a single apparatus.

10. The method of claim 9, wherein the single apparatus comprises a multicolor printer, comprising a printing station for delivering UV-curing inks, and a UV lamp.

11. The method of claim 8, wherein the inks are selected from the group consisting of a toner ink, a low-viscosity ink, an offset ink, a flex ink and a sublimation ink.

12. The method of claim 8, wherein the UV-curing substance comprises a UV-curing varnish or a UV-curing ink.

13. The method of claim 8, wherein the substrate is selected from the group consisting of a woven textile fabric, a printed article, wood and leather.

14. The method of claim 8, wherein the polymeric release layer comprises a hot foil suitable for transfer printing under pressure.

* * * * *